US010455777B1

(12) United States Patent
Dennison

(10) Patent No.: US 10,455,777 B1
(45) Date of Patent: Oct. 29, 2019

(54) ENVIRONMENTALLY-CONTROLLED SECURITY ENCLOSURE FOR PLANT MATERIAL

(71) Applicant: Deman Dennison, Orlando, FL (US)

(72) Inventor: Deman Dennison, Orlando, FL (US)

( * ) Notice: Subject to any disclaimer, the term of this patent is extended or adjusted under 35 U.S.C. 154(b) by 298 days.

(21) Appl. No.: 15/596,031

(22) Filed: May 16, 2017

(51) Int. Cl.
| *A01G 9/26* | (2006.01) |
| *A01G 13/10* | (2006.01) |
| *A01G 7/04* | (2006.01) |
| *A01G 9/02* | (2018.01) |
| *A01G 9/24* | (2006.01) |
| *A01G 27/00* | (2006.01) |
| *A01G 22/00* | (2018.01) |

(52) U.S. Cl.
CPC ............... *A01G 9/26* (2013.01); *A01G 7/045* (2013.01); *A01G 9/02* (2013.01); *A01G 9/246* (2013.01); *A01G 9/247* (2013.01); *A01G 13/10* (2013.01); *A01G 22/00* (2018.02); *A01G 27/00* (2013.01)

(58) Field of Classification Search
CPC .......... A01G 9/24; A01G 9/14; A01G 9/1415; A01G 9/16; A01G 9/18; A01G 9/20; A01G 9/246; A01G 9/26; A01G 13/08; A01G 13/02; A01G 13/0206; A01G 13/0212; A01G 7/045
See application file for complete search history.

(56) References Cited

U.S. PATENT DOCUMENTS

| 3,673,733 | A | * | 7/1972 | Allen | ............... | A01G 9/246 |
| | | | | | | 47/17 |
| 3,746,080 | A | * | 7/1973 | Mallory | ............... | A01G 7/045 |
| | | | | | | 165/229 |
| 4,640,299 | A | | 2/1987 | Ono | | |
| 4,701,415 | A | * | 10/1987 | Dutton | ............... | B01L 1/00 |
| | | | | | | 435/286.6 |
| 5,601,236 | A | * | 2/1997 | Wold | ............... | A01G 27/00 |
| | | | | | | 239/63 |
| 5,842,597 | A | | 12/1998 | Kraus | | |
| 6,116,029 | A | | 9/2000 | Krawec | | |
| 6,308,437 | B1 | | 10/2001 | Villar | | |
| 6,725,598 | B2 | * | 4/2004 | Yoneda | ............... | A01G 9/26 |
| | | | | | | 47/60 |
| D585,534 | S | | 1/2009 | Chen | | |

(Continued)

FOREIGN PATENT DOCUMENTS

WO 2008093248 A2 8/2008
WO WO-2016164652 A1 * 10/2016 ........... A01G 31/047

*Primary Examiner* — Joshua D Huson

(57) ABSTRACT

The environmentally-controlled security enclosure for plant material is adapted for use with a plant. The environmentally-controlled security enclosure for plant material is an environmentally-controlled space within which a plant may be grown, stored, and secured. The environmentally-controlled security enclosure for plant material comprises an inner housing, an environmental system, an internal frame, an outer frame, and a control system. The plant is maintained within the inner housing. The environmental system controls the environmental conditions within the inner housing. The internal frame is a framework upon which the inner housing, the environmental system, and the control system are mounted. The outer frame is an exterior shell within which the internal frame, the inner housing, the environmental system and the control system are contained.

15 Claims, 9 Drawing Sheets

(56) References Cited

U.S. PATENT DOCUMENTS

| | | | |
|---|---|---|---|
| 7,754,477 B2* | 7/2010 | Osawa | C12M 23/48 |
| | | | 219/407 |
| 8,327,580 B2* | 12/2012 | Miyahara | A01G 9/16 |
| | | | 47/60 |
| 8,453,376 B2* | 6/2013 | Chen | A01G 7/045 |
| | | | 47/58.1 LS |
| 8,850,742 B2* | 10/2014 | Dube | A01G 7/045 |
| | | | 47/17 |
| 9,016,285 B2 | 4/2015 | Riddick | |
| 9,591,815 B2* | 3/2017 | Fujiyama | A01G 9/00 |
| 2003/0005626 A1* | 1/2003 | Yoneda | A01G 9/26 |
| | | | 47/69 |
| 2005/0178058 A1* | 8/2005 | Rudolph | A61K 36/00 |
| | | | 47/60 |
| 2005/0183330 A1* | 8/2005 | Rudolph | A61K 36/00 |
| | | | 47/58.1 FV |
| 2014/0026474 A1* | 1/2014 | Kulas | A01G 22/00 |
| | | | 47/1.7 |
| 2014/0318012 A1* | 10/2014 | Fujiyama | F24F 11/0001 |
| | | | 47/62 R |
| 2017/0223912 A1* | 8/2017 | Gagne | A01G 25/16 |
| 2018/0007845 A1* | 1/2018 | Martin | A01G 31/047 |

* cited by examiner

ENVIRONMENTALLY-CONTROLLED SECURITY ENCLOSURE FOR PLANT MATERIAL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture including horticulture, more specifically, a device for affording protection to a plant against animals, birds, or other pests that further comprises an air circulation system.

SUMMARY OF INVENTION

The environmentally-controlled security enclosure for plant material is adapted for use with a plant. The environmentally-controlled security enclosure for plant material is an environmentally-controlled space within which a plant may be grown, stored, and secured. The environmentally-controlled security enclosure for plant material comprises an inner housing, an environmental system, an internal frame, an outer frame, and a control system. The plant is maintained within the inner housing. The environmental system controls the environmental conditions within the inner housing. The internal frame is a framework upon which the inner housing, the environmental system, and the control system are mounted. The outer frame is an exterior shell within which the internal frame, the inner housing, the environmental system and the control system are contained.

These together with additional objects, features and advantages of the environmentally-controlled security enclosure for plant material will be readily apparent to those of ordinary skill in the art upon reading the following detailed description of the presently preferred, but nonetheless illustrative, embodiments when taken in conjunction with the accompanying drawings.

In this respect, before explaining the current embodiments of the environmentally-controlled security enclosure for plant material in detail, it is to be understood that the environmentally-controlled security enclosure for plant material is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the environmentally-controlled security enclosure for plant material.

It is therefore important that the claims be regarded as including such equivalent construction insofar as they do not depart from the spirit and scope of the environmentally-controlled security enclosure for plant material. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
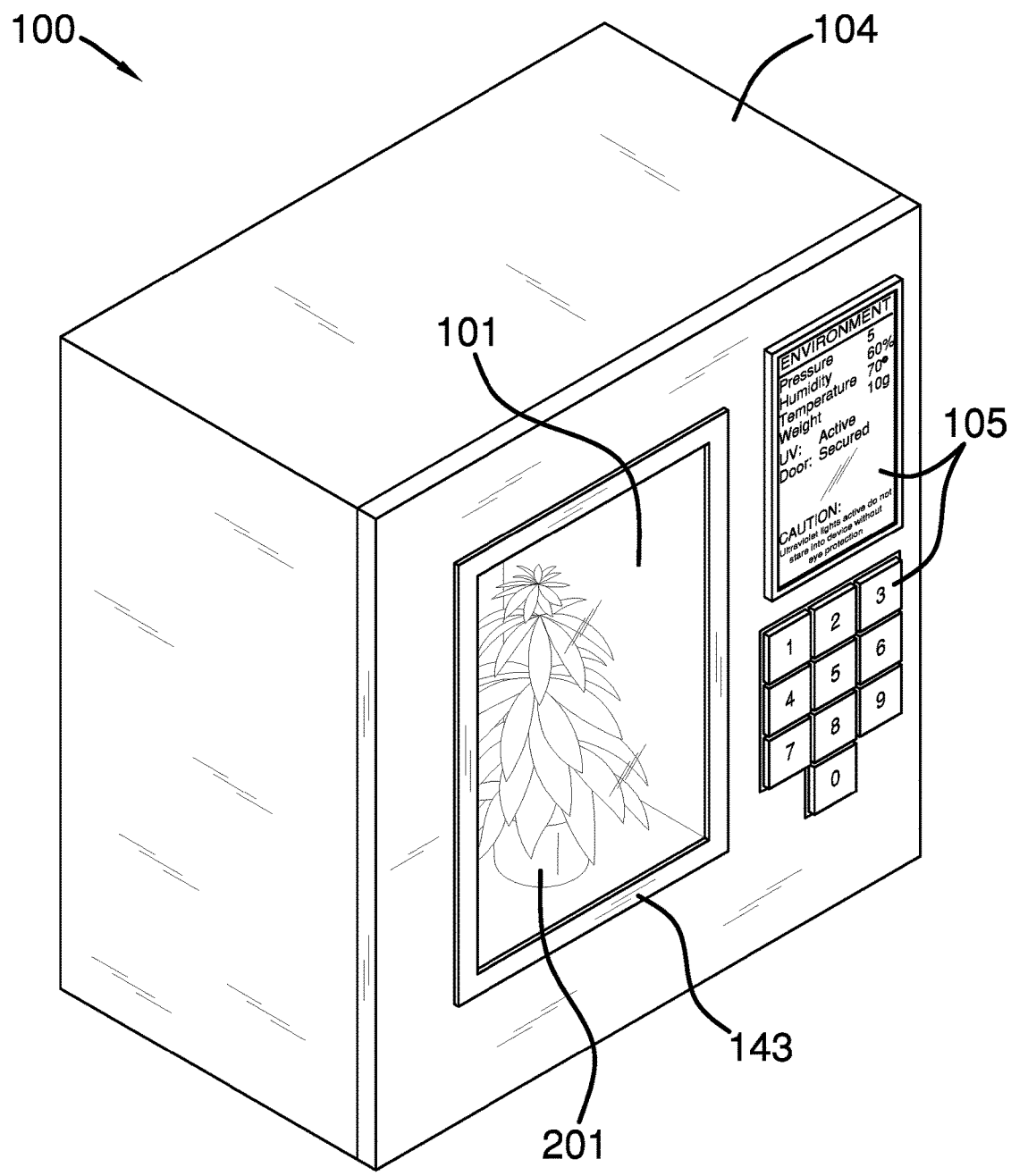
FIG. 1 is a perspective view of an embodiment of the disclosure.
Figure 2:
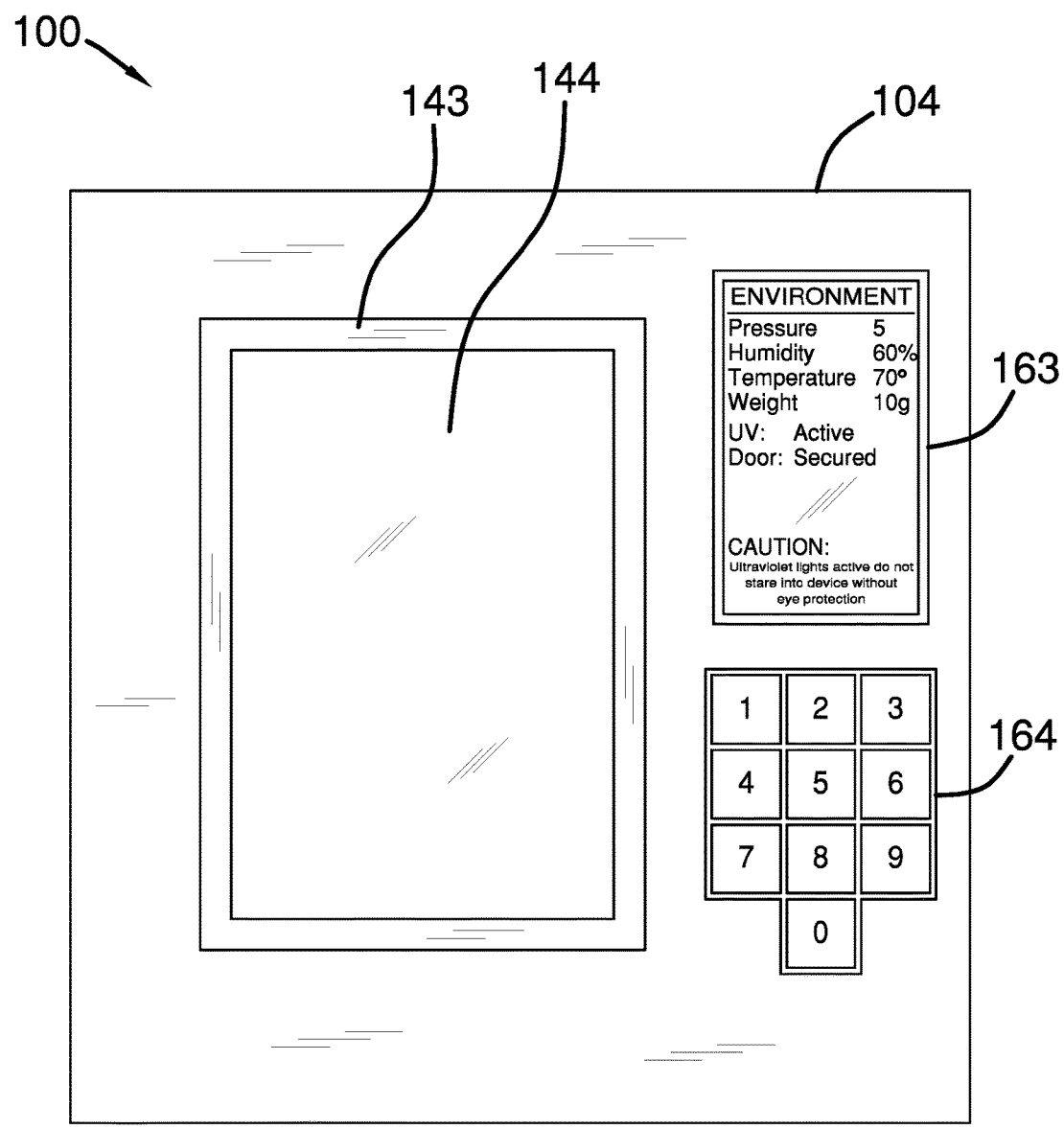
FIG. 2 is a front view of an embodiment of the disclosure.
Figure 3:
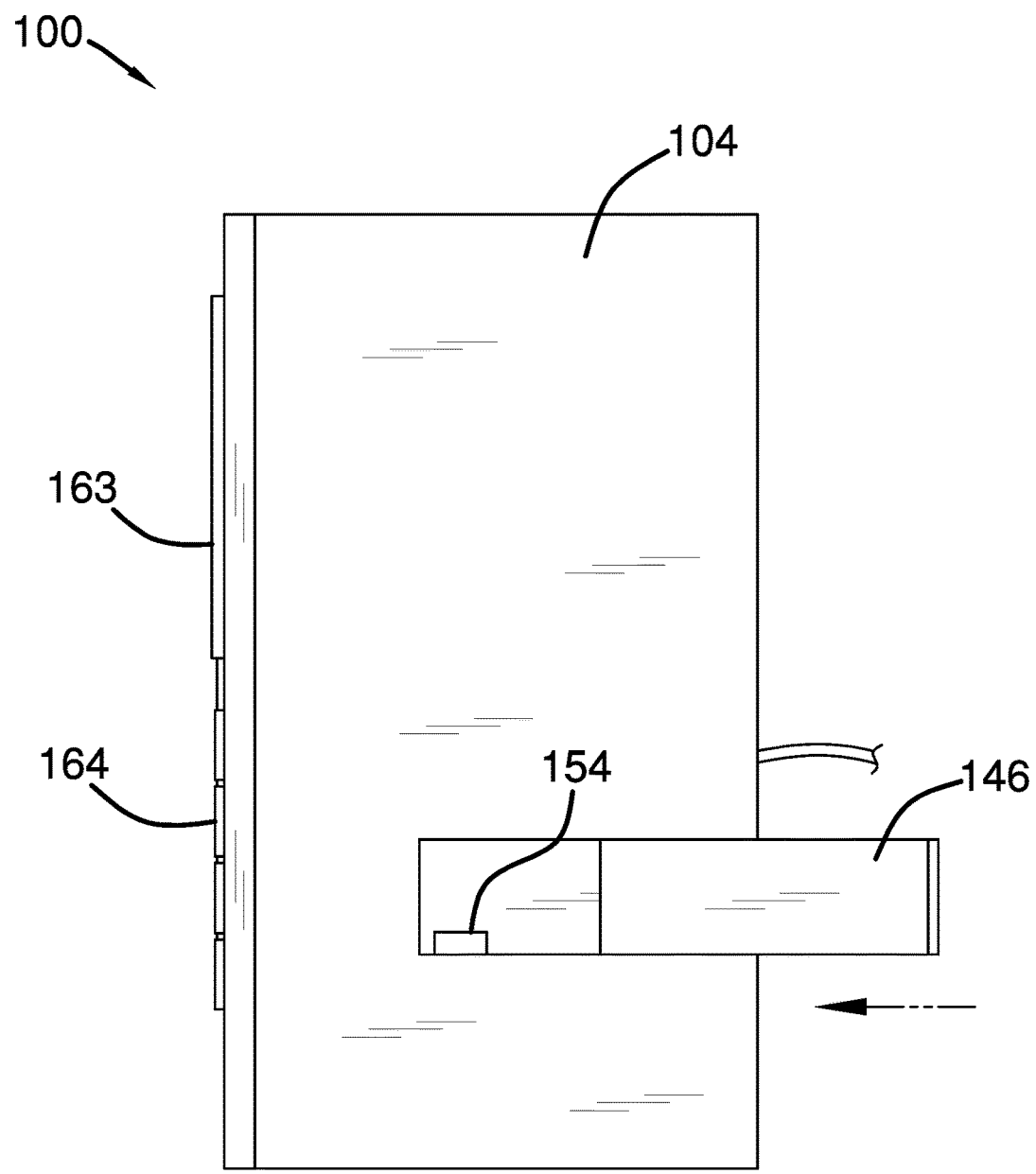
FIG. 3 is a side view of an embodiment of the disclosure.
Figure 4:
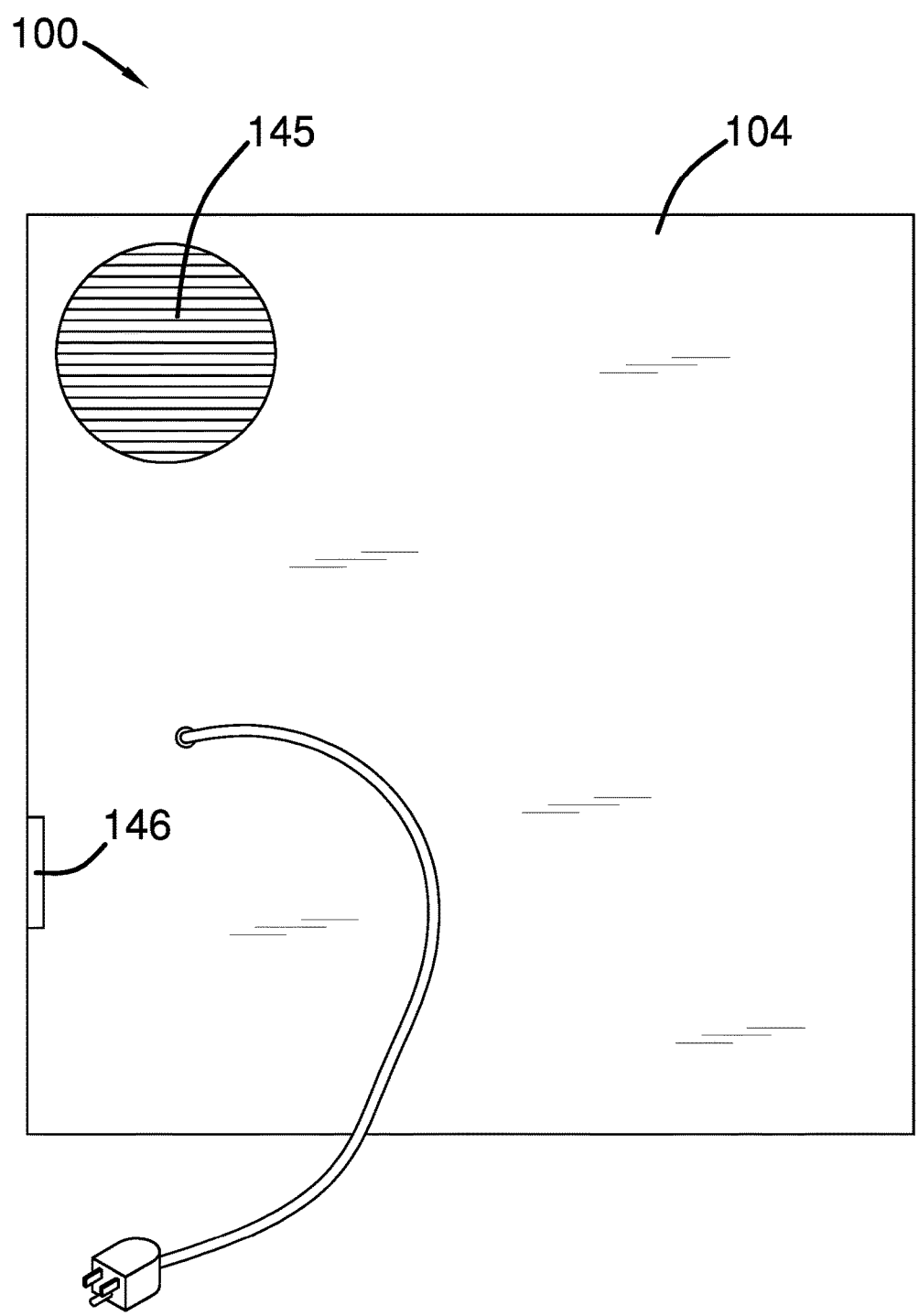
FIG. 4 is a rear view of an embodiment of the disclosure.
Figure 5:
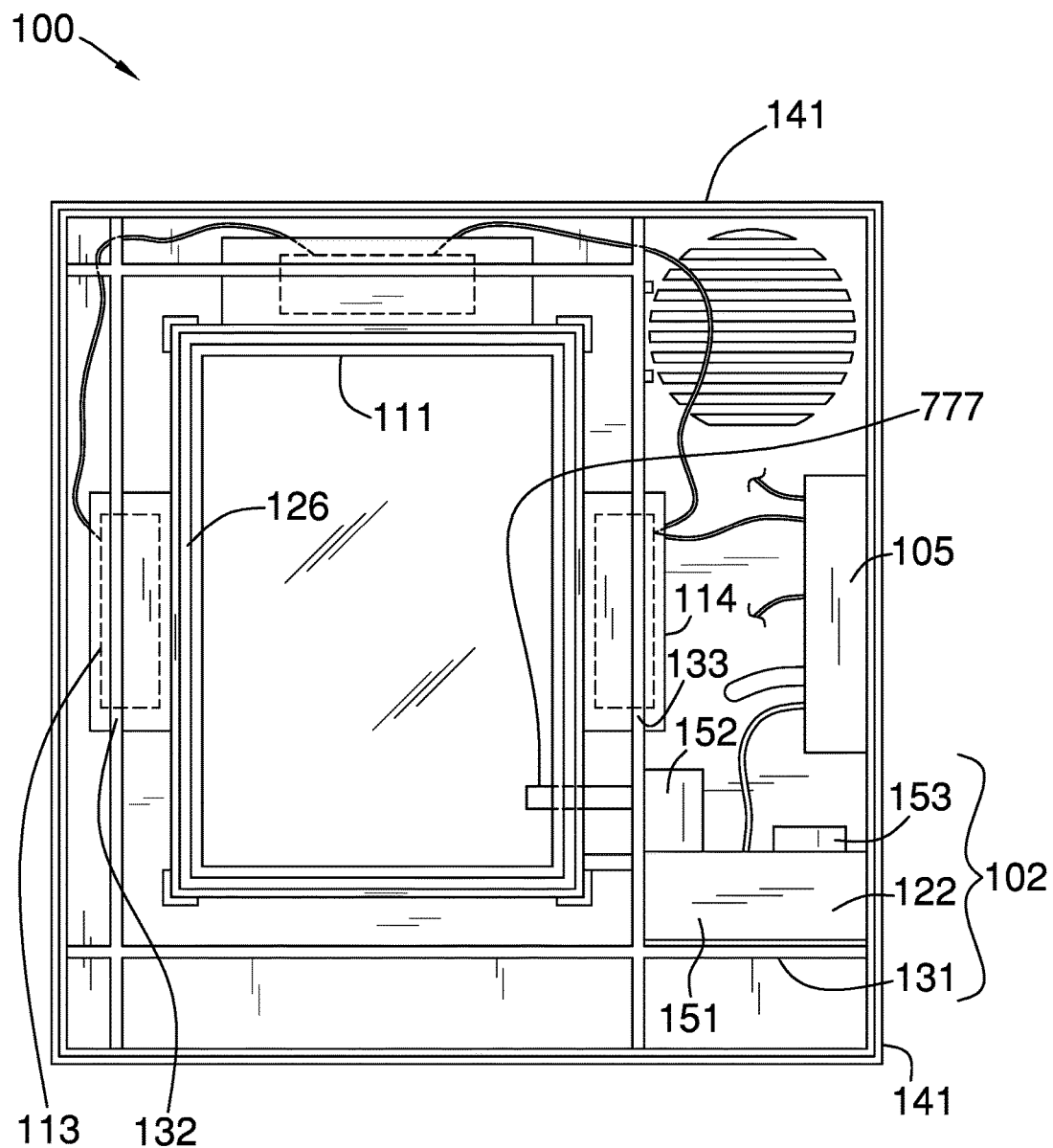
FIG. 5 is an internal view of an embodiment of the disclosure.
Figure 6:
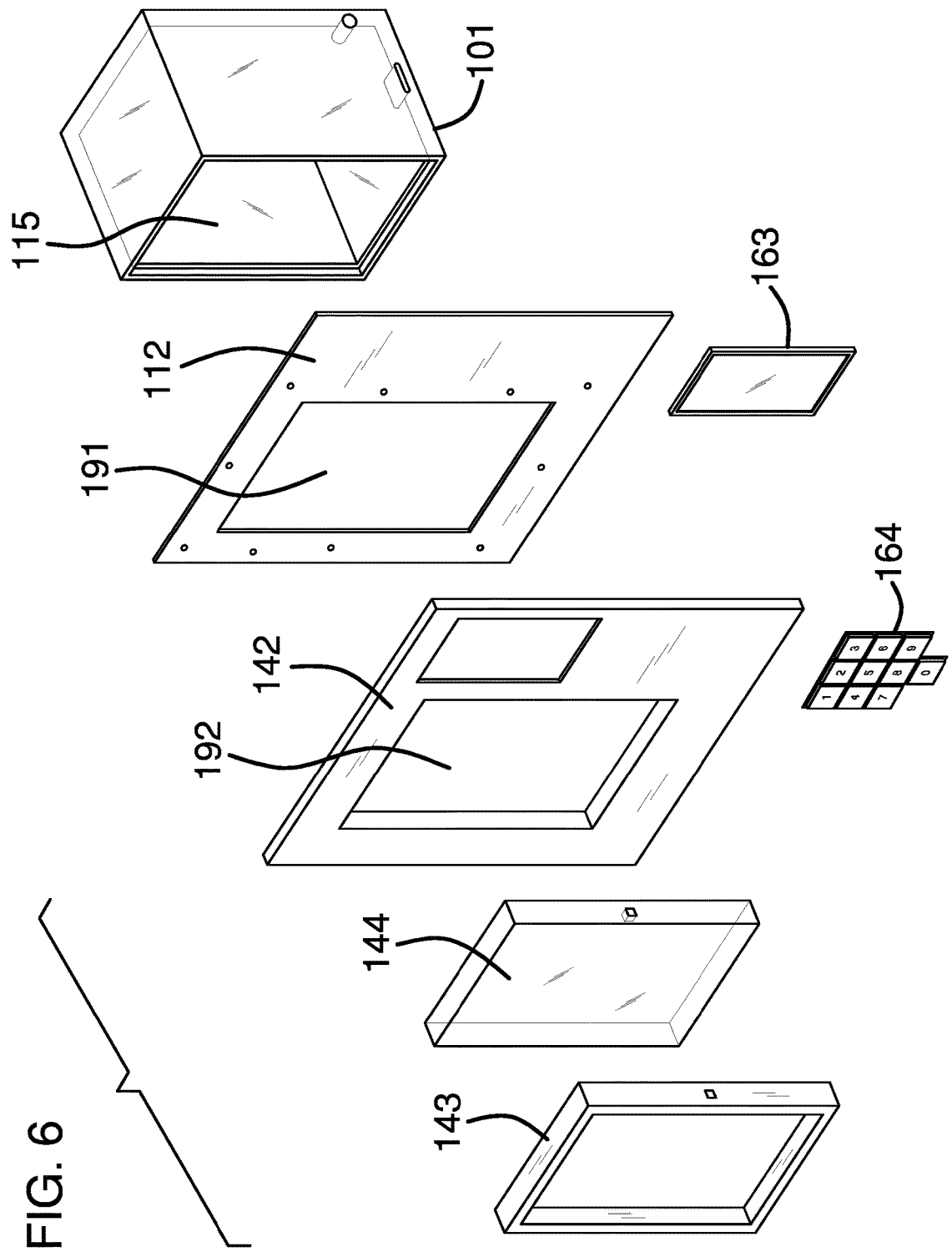
FIG. 6 is an exploded view of an embodiment of the disclosure.
Figure 7:
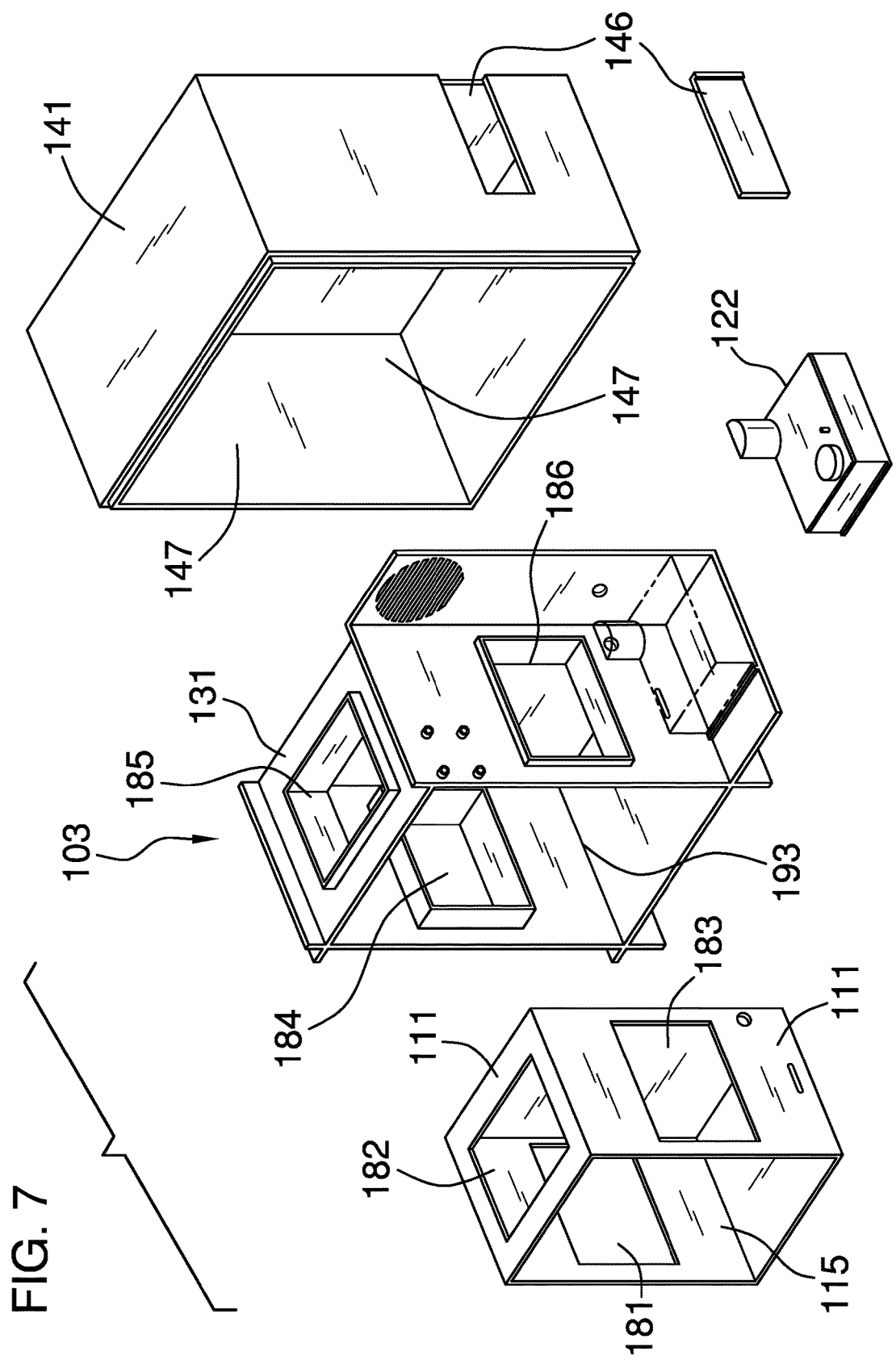
FIG. 7 is an exploded view of an embodiment of the disclosure.
Figure 8:
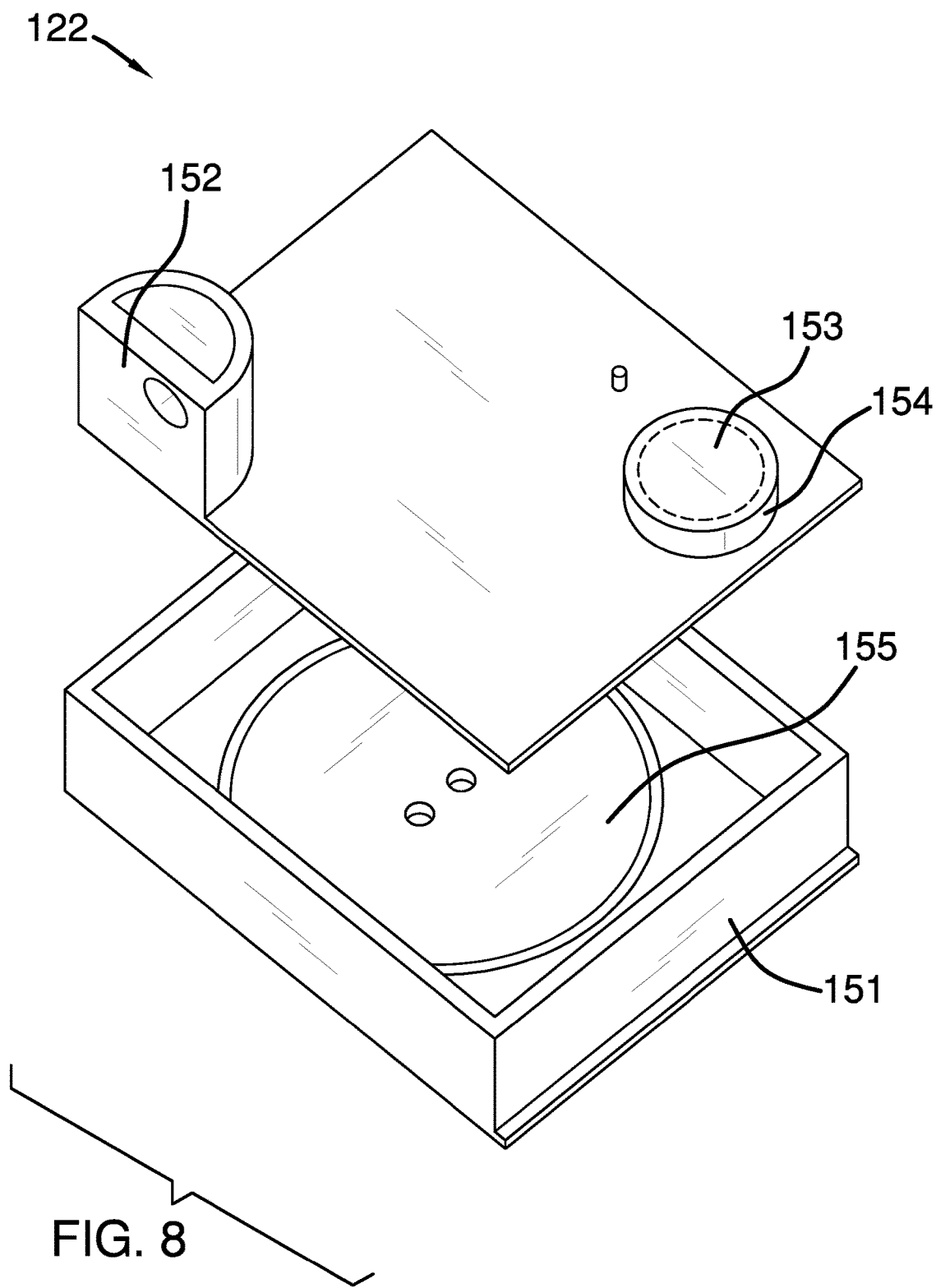
FIG. 8 is a detailed view of an embodiment of the disclosure.
Figure 9:
FIG. 9 is a block diagram of an embodiment of the disclosure.

Detailed reference will now be made to one or more potential embodiments of the disclosure, which are illustrated in FIGS. 1 through 9.

The environmentally-controlled security enclosure for plant 201 material 100 (hereinafter invention) is adapted for use with a plant 201. The invention 100 is an environmentally-controlled space within which a plant 201 may be grown, stored, and secured. The plant 201 is maintained within the inner housing 101. The environmental system 102 controls the environmental conditions within the inner housing 101. The outer frame 104 is an exterior shell within which the internal frame 103, the inner housing 101, the environmental system 102 and the control system 105 are contained. In a second potential embodiment of the disclosure, the invention 100 further comprises an internal frame 103. The internal frame 103 is a framework positioned within the outer frame 104 and upon which the inner housing 101, the environmental system 102, and the control system 105 are mounted.

The inner housing 101 is a first hollow rectangular block structure. The inner housing 101 physically contains the plant 201. The inner housing 101 is formed with a first open face 115. The first open face 115 is the opening through which the plant 201 is introduced and withdrawn from the inner housing 101. The inner housing 101 comprises an inner structure 111, an inner panel 112, an exchange fan 113, a makeup fan 114, and a first open face 115. The inner housing 101 further comprises a first lamp 171, a second lamp 172, and a third lamp 173. Within this disclosure, it is assumed that the inner housing 101 is formed with all necessary apertures and form factors necessary to allow the housing to accommodate the use and operation of the invention 100 even if these apertures and form factors are not discussed within this disclosure.

The inner structure 111 is a first five sided hollow rectangular block structure that forms the interior chamber of the inner housing 101. The open sixth side of the inner structure 111 forms the first open face 115. The inner panel 112 is a separate rectangular plate that is used to enclose the first open face 115. The inner panel 112 comprises a first door aperture 191. The first door aperture 191 forms an aperture within the inner structure 111. The glass door 144 is installed within the first door aperture 191.

The exchange fan 113 is a readily and commercially available fan that: 1) is mounted through a wall of the inner structure 111; and, 2) expels air from the interior chamber of the inner housing 101. The makeup fan 114 is a readily and commercially available fan that: 1) is mounted through a wall of the inner structure 111; and, 2) pumps air into the interior chamber of the inner housing 101. The exchange fan 113 and the makeup fan 114 are used in combination to exchange the air within the inner chamber of the inner housing 101.

The first lamp 171 is a UVC lamp. The second lamp 172 is a UVC lamp. The third lamp 173 is a UVC lamp. In the first potential embodiment of the disclosure, the first lamp 171, the second lamp 172, and the third lamp 173 are identical. The first lamp 171 is formed from a plurality of LEDs that generate UVC radiation.

The environmental system 102 is an apparatus that maintains the temperature and humidity within the inner housing 101 during normal use of the invention 100. The environmental system 102 maintains a growing environment within the inner housing 101 for the benefit of the plant 201 that is stored there. The environmental system 102 comprises a temperature module 121 and a humidity control 122.

The temperature module 121 is an apparatus that controls the temperature within the inner chamber of the inner housing 101. In the first potential embodiment of the disclosure, the temperature module 121 comprises a Peltier module 125. The Peltier module 125 is used to add heat to or withdraw heat from the inner chamber of the inner housing 101.

The Peltier module 125 is both a heating element and cooling element depending on the direction of the current flow through the device. The Peltier module 125 has two surfaces on opposite sides of the device. When current flows through the Peltier module 125, heat is transferred from one surface to the surface on the opposite side of the Peltier module 125. This creates a cold side and a warm side of the Peltier module 125 that can be used as the cooling or heating elements of the inner housing 101. If the current flow through the Peltier device is reversed, the direction of heat transfer are reversed such that the cold and warm sides of the Peltier module 125 are also reversed.

The humidity control 122 is an apparatus that controls the humidity within the inner chamber of the inner housing 101. The humidity control 122 comprises a tank 151, a tank hood 152, a fill aperture 153, and a fill cap 154.

The tank 151 is a hollow rectangular block structure that forms a water reservoir intended for use by the humidity control 122. The tank hood 152 is a pipe 777 that connects the tank 151 to the interior chamber of the inner housing 101 such that water vapor can escape from the tank 151 into the interior chamber of the inner housing 101 for humidity management purposes. The fill aperture 153 is an aperture that is formed within the superior surface of the tank 151. The fill aperture 153 forms a port through which water is introduced into the tank 151. The fill cap 154 is a lid that is used to close the fill aperture 153 when the fill aperture 153 is not being used.

The heater 155 is a readily and commercially available electrical heater that is mounted on the inferior surface of the tank 151. The heater 155 is used to heat water to create water vapor. The heater 155 is controlled by the control system 105.

The outer frame 104 is a housing that contains the inner housing 101, the environmental system 102, the control system 105, and, when used, the internal frame 103. The outer frame 104 comprises an outer structure 141, a front cover 142, a door frame 143, a glass door 144, an exhaust fan 145, tank cover 146, and a second open face 147. Within this disclosure, it is assumed that the outer frame 104 has formed with all necessary apertures and form factors necessary to allow the housing to accommodate the use and operation of the invention 100 even if these apertures and form factors are not discussed within this disclosure.

The outer frame 104 is formed with a second open face 147. The second open face 147 refers to the open face that forms the sixth side of the outer structure 141. The second open face 147 is the opening through which the plant 201 is introduced and withdrawn from the inner housing 101.

The outer structure 141 is a second five sided rectangular block structure that forms the exterior surfaces of the invention 100.

The front cover 142 is a separate rectangular plate that is used to enclose the outer structure 141. The front cover 142 comprises a second door aperture 192. The second door aperture 192 is an aperture that is formed within the outer structure 141. The glass door 144 is installed within the second door aperture 192. The door frame 143 is a structural frame that is inserted into the first door aperture 191 and the second door aperture 192. The door frame 143 provides the structural support required to attach the glass door 144 to the inner housing 101.

The glass door 144 is a rotating barrier that is used to control access to the interior chamber of the inner housing 101. The glass door 144 comprises the hinges necessary to allow for this rotation. The exhaust fan 145 is an electrical device that cools the interior spaces of the outer frame 104. The use of an exhaust fan 145 is well known and documented by those skilled in the electrical arts. The tank cover 146 is a door that is formed through the exterior surface of the outer structure 141. The tank cover 146 provides access to the fill aperture 153 of the tank 151.

The control system 105 is an electrical device that: 1) limits access into and out of the inner housing 101; and, 2) regulates the growing conditions maintained within the inner housing 101. The control system 105 comprises a logic module 161, a communication module 162, a display 163, a keypad 164, an electronic lock 165, an air temperature sensor 166, a humidity sensor 167, a carbon dioxide sensor 168, and a pressure sensor 169.

The logic module 161 is a readily and commercially available programmable electronic device that is used to manage, regulate, and operate the control system 105. The communication module 162 is a readily and commercially available wireless electronic communication device that allows the logic module 161 to communicate with an externally provided personal data device.

The logic module 161 controls the operation of the exchange fan 113, the makeup fan 114, the heater 155, the display 163, the keypad 164, and the electronic lock 165, the temperature module 121, the first lamp 171, the second lamp 172, and the third lamp 173. In the first potential embodiment of the disclosure, the logic module 161 specifically controls the operation of the Peltier module 125. In the second potential embodiment of the disclosure, the logic module 161 specifically controls the operation of the hot water valve 127 and the cold water valve 128. The logic module 161 monitors readings from the air temperature sensor 166, the humidity sensor 167, the carbon dioxide sensor 168 and the pressure sensor 169. In the second potential embodiment of the disclosure, the logic module 161 further monitors the water temperature sensor 129. Methods to program and configure a logic module to perform these functions are well known and documented in the electrical arts.

The display 163 is a readily and commercially available LCD device that is used as a local interface to the control system 105. The keypad 164 is a readily and commercially available data entry device that is used as a local interface to the control system 105. The electronic lock 165 is a readily and commercially available electronically controlled lock that is used to lock the glass door 144 in a closed position.

The air temperature sensor 166 is a readily and commercially available electrical sensor that monitors the temperature within the inner chamber of the inner housing 101. The humidity sensor 167 is a readily and commercially available electrical sensor that monitors the humidity within the inner chamber of the inner housing 101. The carbon dioxide sensor 168 is a readily and commercially available electrical sensor that monitors the carbon dioxide levels within the inner chamber of the inner housing 101. The pressure sensor 169 is a readily and commercially available electrical sensor that monitors the barometric pressure within the inner chamber of the inner housing 101.

In a fifth potential embodiment of the disclosure, the communication module 162 establishes a Bluetooth connection between the logic module 161 and the externally provided personal data device. Methods to establish Bluetooth communication connections are well known and documented in the mechanical arts In a sixth potential embodiment of the disclosure, the communication module 162 communicates SMS and MMS messages between the logic module 161 and an appropriate authority through a commercially provided and publicly available cellular wireless network. The use of a commercially provided and publicly available cellular wireless network is preferred because: 1) of its low cost; 2) of its widespread availability and broad interoperability between competing commercially provided and publicly available cellular wireless networks; and, 3) methods and techniques to send SMS and MMS messages over a commercially provided and publicly available cellular wireless network are well known and documented by those skilled in the electrical arts.

The inner structure 111 is inserted into the outer structure 141 such that the first open face 115 and the second open face 147 face in the same direction. The inner panel 112 attaches to the first open face 115 of the inner structure 111. The front cover 142 attaches to the second open face 147 of the front cover 142 such that the first door aperture 191 and the second door aperture 192 are aligned. The door frame 143 attaches within the second door aperture 192 of the front cover 142. The glass door 144 attaches to the door frame 143 such that: 1) the glass door 144 rotates into and out of the door frame 143; and, 2) the electronic lock 165 is placed in a position such that the electronic lock 165 will lock the glass door 144 into a secured position.

The first lamp 171, the second lamp 172, and the third lamp 173 are secured onto the interior surfaces of the inner housing 101 such that the first lamp 171, the second lamp 172, and the third lamp 173 will illuminate the plants contained within the inner housing 101.

The heater 155 is contained within the tank 151. The tank hood 152, the fill aperture 153, and the fill cap 154 are all installed in the superior surface of the tank 151. The air temperature sensor 166, the humidity sensor 167, the carbon dioxide sensor 168, and the pressure sensor 169 are mounted within the interior space of the inner structure 111. The air temperature sensor 166, the humidity sensor 167, the carbon dioxide sensor 168, and the pressure sensor 169 are electrically connected to the logic module 161.

In a second potential embodiment of the disclosure, the invention 100 comprises an internal frame 103. The internal frame 103 is a rectilinear structure that is mounted within the outer frame 104. The inner housing 101 is mounted in the internal frame 103 such that the exterior surfaces of the inner housing 101 are isolated from the interior surfaces of the outer frame 104. Within this disclosure, it is assumed that the internal frame 103 has formed with all necessary apertures and form factors necessary to allow the housing to accommodate the use and operation of the invention 100 even if these apertures and form factors are not discussed within this disclosure.

In the second potential embodiment of the disclosure, the inner structure 111 is further modified to comprise a first window aperture 181, a second window aperture 182, and a third window aperture 183. The first window aperture 181 is an aperture that is formed within the inner structure 111 and through which UVC radiation is projected. The second window aperture 182 is an aperture that is formed within the inner structure 111 and through which UVC radiation is projected. The third window aperture 183 is an aperture that is formed within the inner structure 111 and through which UVC radiation is projected.

The internal frame 103 comprises an internal structure 131. The internal structure 131 is a rectilinear frame that is the primary structure of the internal frame 103. The internal structure 131 further comprises an exchange fan vent 132 and a makeup fan vent 133. The internal structure 131 comprises a fourth window aperture 184, a fifth window aperture 185, and a sixth window aperture 186. The internal structure 131 comprises a third door aperture 193. The third door aperture 193 is an opening formed within the internal structure 131 that accommodates the installation of the glass door 144.

The exchange fan vent 132 is an aperture formed within the internal structure 131 that accommodates the expulsion of exhaust air from the inner housing 101. The makeup fan vent 133 is an aperture formed within the internal structure 131 that accommodates the introduction of makeup air from the inner housing 101.

The fourth window aperture 184 is an aperture that is formed within the internal structure 131. The fourth window aperture 184 provides maintenance access to the first lamp 171. The fifth window aperture 185 is an aperture that is formed within the internal structure 131. The fifth window aperture 185 provides maintenance access to the second lamp 172. The sixth window aperture 186 is an aperture that is formed within the internal structure 131. The sixth window aperture 186 provides maintenance access to the third lamp 173.

The internal structure 131 is installed within the outer structure 141 before installation of the inner structure 111.

The inner structure 111 is installed within the internal structure 131 such that: 1) the first window aperture 181 is aligned with the fourth window aperture 184; 2) the second window aperture 182 is aligned with the fifth window aperture 185; 3) the third window aperture 183 is aligned with the sixth window aperture 186. The first lamp 171 is installed between the first window aperture 181 and the fourth window aperture 184 such that the interior space of the inner structure 111 is illuminated. The second lamp 172 is installed between the second window aperture 182 and the fifth window aperture 185 such that the interior space of the inner structure 111 is illuminated. The third lamp 173 is installed between the third window aperture 183 and the sixth window aperture 186 such that the interior space of the inner structure 111 is illuminated.

A third potential embodiment of the disclosure is identical to the first potential embodiment of the disclosure except for the modifications described in this disclosure. Specifically, the Peltier module 125 is replaced with a water sleeve 126. The water sleeve 126 refers to a rectangular block structure formed from two independent rectangular block that are assembled in a coaxial manner. In this configuration, the water sleeve 126 forms the physical structure of the inner structure 111. The water sleeve 126 comprises a hot water valve 127 and a cold water valve 128. The hot water valve 127 is connected to an external source of hot water. The cold water valve 128 is connected to an external source of cold water. The hot water valve 127 is electrically connected to the logic module 161. The cold water valve 128 is electrically connected to the logic module 161.

The water sleeve 126 forms a negative space between the two independent rectangular blocks through which water is pumped for the purposes of maintaining or changing the temperature within the internal chamber of the inner housing 101. The hot water valve 127 is a solenoid valve that releases hot water into the water sleeve 126 for the purpose of increasing the temperature of the interior chamber of the inner housing 101. The cold water valve 128 is a solenoid valve that releases cold water into the water sleeve 126 for the purpose of decreasing the temperature of the interior chamber of the inner housing 101. The water sleeve 126 further comprises a water temperature sensor 129. The water temperature sensor 129 is a sensor that measures the temperature of the water flowing through the negative space of the water sleeve 126. The water sleeve 126 is monitored by the control system 105.

A fourth potential embodiment of the disclosure is identical to the third potential embodiment of the disclosure wherein the modification described in the third potential embodiment of the disclosure are applied to the fourth potential embodiment of the disclosure.

The following definitions were used in this disclosure:

Align: As used in this disclosure, align refers to an arrangement of objects that are: 1) arranged in a straight line; or, 2) arranged to give a directional sense of a plurality of parallel lines.

Appropriate Authority: As used in this disclosure, an appropriate authority is a previously determined person or organization that is designated to receive alarm or other notification messages regarding a monitored system or activity.

CO2: As used in this disclosure, CO2 is the chemical designation, and is used as an acronym, for carbon dioxide.

Coaxial: As used in this disclosure, coaxial is an term that refers to a first object that is inserted or contained within a second object such: 1) that the first object and the second object share the same center point if the or first object and the second object are treated as a two dimensional objects; or, 2) that the first object and the second object share the same center axis if the or first object and the second object are treated as three dimensional objects.

Control System: As used in this disclosure, a control system is a first device or system that manages and regulates the behavior or operation of a second device or system.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner.

Exterior: As used in this disclosure, the exterior is use as a relational term that implies that an object is not contained within the boundary of a structure or a space.

Fan: As used in this disclosure, a fan is a mechanical device with rotating blades that is used to create a flow or current of air.

Hinge: As used in this disclosure, a hinge is a device that permits the turning, rotating, or pivoting of a first object relative to a second object.

Housing: As used in this disclosure, a housing is a rigid casing that encloses and protects one or more devices.

Interface: As used in this disclosure, an interface is a physical or virtual boundary that separates two different systems across which information is exchanged.

Interior: As used in this disclosure, the interior is use as a relational term that implies that an object is contained within the boundary of a structure or a space.

LCD: As used in this disclosure, LCD is an acronym for Liquid Crystal Display. A liquid crystal display comprises a liquid crystal film placed between two sheets of transparent material. The visual characteristics of the can be varied through the application of a voltage.

LED: As used in this disclosure, an LED is an acronym for a light emitting diode. A light emitting diode is a diode that is also a light source.

Lid: As used in this disclosure, a lid is a removable cover that is placed on a hollow structure to contain the contents within the hollow structure.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Makeup Air: As used in this disclosure, makeup air is air that permitted to enter a enclose space for the purpose of replacing air that has been evacuated in some manner, for example by a fan, from the enclosed space.

Negative Space: As used in this disclosure, negative space is a method of defining an object through the use of open or empty space as the definition of the object itself, or, through the use of open or empty space to describe the boundaries of an object.

Peltier Module: As used in this disclosure, a Peltier module refers to a flat solid state device that uses the Peltier thermoelectric effect to create a warm side of the device and a cool side of the device. The side of the device that is warm and the side of the device that is cool can be reversed via reversing the current flow through the device.

Personal Data Device: As used in this disclosure, a personal data device is a handheld device that is used for managing personal information and communication. Examples of personal data device include, but are not limited to, cellular phones, tablets and smart phones.

Pivot: As used in this disclosure, a pivot is a rod or shaft around which an object rotates or swings.

Port: As used in this disclosure, a port is an opening formed in an object that allows fluid to flow through the boundary of the object.

Rectangular Block: As used in this disclosure, a rectangular block refers to a three dimensional structure comprising six rectangular surfaces formed at right angles. Within this disclosure, a rectangular block may further comprises rounded edges and corners.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Shell: As used in this disclosure, a shell is a structure that forms an outer covering intended to contain an object. A shell is a rigid structure that is intended to protect the object contained within it.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services, which is abbreviated as MMS.

Solenoid: As used in this disclosure, a solenoid is a cylindrical coil of electrical wire that generates a magnetic field that can be used to mechanically move a shaft made of a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port.

Ultraviolet Light: As used in this disclosure, ultraviolet light is understood to be electromagnetic radiation with a wavelength lesser than visible light. In general usage, ultraviolet light is taken to mean electromagnetic radiation with a wavelength less than 400 nm.

Ultraviolet C Light: As used in this disclosure, ultraviolet C light is understood to be ultraviolet light with wavelengths in the range of 200 nm to 300 nm. Ultraviolet C light is considered to be the most effective light for disinfection. Within the ultraviolet C range, the most effective disinfection is considered to occur with radiation wavelengths between 248 nm and 262 nm.

Valve: As used in this disclosure, a valve is a device that is use to control the flow of a fluid (gas or liquid) through a pipe.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A security device for a plant comprising:
wherein the security device for a plant comprises an inner housing, an environmental system, an outer frame, and a control system;
wherein the inner housing, the environmental system, and the control system are mounted within the outer frame;
wherein the plant is contained within the inner housing;
wherein the environmental system controls the environmental conditions within the inner housing;
wherein the environmental system is an apparatus that maintains the temperature and humidity within the inner housing;
wherein the environmental system comprises a temperature module and a humidity control;
wherein the temperature module is an apparatus that controls the temperature within the inner chamber of the inner housing;
wherein the humidity control is an apparatus that controls the humidity within the inner chamber of the inner housing;
wherein the control system is an electrical device that limits access into and out of the inner housing;
wherein the control system regulates the environmental conditions maintained within the inner housing;
wherein the control system comprises a logic module, a communication module, a display, a keypad, an electronic lock, an air temperature sensor, a humidity sensor, a carbon dioxide sensor, and a pressure sensor;
wherein the logic module, the communication module, the display, the keypad, the electronic lock, the air temperature sensor, the humidity sensor, the carbon dioxide sensor, and the pressure sensor are electrically interconnected;

wherein the inner housing is a first hollow rectangular block structure;

wherein the inner housing comprises an inner structure, an inner panel, an exchange fan, a makeup fan, and a first open face;

wherein the inner housing further comprises a first lamp, a second lamp, and a third lamp;

wherein the inner panel, the exchange fan, the makeup fan, the first lamp, the second lamp, and the third lamp are mounted on the inner structure;

wherein the outer frame is a housing that contains the inner housing, the environmental system, and the control system;

wherein the outer frame comprises an outer structure, a front cover, a door frame, a glass door, an exhaust fan, tank cover, and a second open face;

wherein the front cover, the door frame, the glass door, the exhaust fan, the tank cover and the second open face are attached to the outer structure;

wherein the inner panel forms an interior chamber of the inner housing; wherein the inner panel is a separate rectangular plate that is used to enclose the first open face;

wherein the inner panel comprises a first door aperture;

wherein the first door aperture forms an aperture into the inner structure;

wherein the exchange fan is mounted through a wall of the inner structure;

wherein the exchange fan expels air from the interior chamber of the inner housing;

wherein the makeup fan is mounted through a wall of the inner structure;

wherein the makeup fan pumps air into the interior chamber of the inner housing;

wherein the first lamp is a UVC lamp;

wherein the second lamp is a UVC lamp;

wherein the third lamp is a UVC lamp;

wherein the first lamp, the second lamp, and the third lamp are identical.

2. The security device for a plant according to claim 1 wherein the humidity control comprises a tank, a tank hood, a fill aperture, and a fill cap;

wherein the tank is a hollow rectangular block structure that forms a water reservoir;

wherein the tank hood is a pipe that connects the tank to the interior chamber of the inner structure such that water vapor can escape from the tank into the interior chamber of the inner structure;

wherein the fill aperture is an aperture that is formed within the superior surface of the tank;

wherein the fill cap is a lid that is used to close the fill aperture;

wherein the heater is an electrical heater that is mounted on the inferior surface of the tank.

3. The security device for a plant according to claim 2 wherein the outer structure is a second five sided rectangular block structure that forms the exterior surfaces of the security device for a plant;

wherein the front cover is a separate rectangular plate that encloses the outer structure;

wherein the front cover comprises a second door aperture;

wherein the second door aperture is an aperture into the interior structure;

wherein the glass door is installed within the second door aperture.

4. The security device for a plant according to claim 3 wherein the door frame is a structural frame that is inserted into the first door aperture and the second door aperture;

wherein the glass door is a rotating barrier that is used to control access to the interior chamber of the inner housing;

wherein the glass door includes hinges necessary for this rotation;

wherein the exhaust fan is an electrical device that cools the interior spaces of the outer frame;

wherein the tank cover is a door that is formed through the exterior surface of the outer structure.

5. The security device for a plant according to claim 4 wherein the logic module controls the operation of the exchange fan, the makeup fan, the heater, the display, the keypad, and the electronic lock, the temperature module, the first lamp, the second lamp, the third lamp, wherein the logic module monitors the air temperature sensor, the humidity sensor, the carbon dioxide sensor and the pressure sensor;

wherein the logic module is a programmable electronic device;

wherein the communication module is a wireless electronic communication device that allows the logic module to wirelessly communicate with an externally provided device.

6. The security device for a plant according to claim 5 wherein the temperature module comprises a Peltier module;

wherein the logic module controls the operation of the Peltier module;

wherein the display is an LCD device;

wherein the keypad is a data entry device;

wherein the electronic lock is an electronically controlled lock that is used to lock the glass door in a closed position;

wherein the air temperature sensor is an electrical sensor that monitors the temperature within the inner chamber of the inner housing;

wherein the humidity sensor is an electrical sensor that monitors the humidity within the inner chamber of the inner housing;

wherein the carbon dioxide sensor is an electrical sensor that monitors the carbon dioxide levels within the inner chamber of the inner housing;

wherein the pressure sensor is an electrical sensor that monitors the barometric pressure within the inner chamber of the inner housing.

7. The security device for a plant according to claim 6 wherein the inner structure is inserted into the outer structure such that the first open face and the second open face both face in the same direction;

wherein the inner panel attaches to the first open face of the inner structure;

wherein the front cover attaches to the second open face of the front cover such that the first door aperture and the second door aperture are aligned;

wherein the door frame attaches within the second door aperture of the front cover;

wherein the glass door attaches to the door frame such that the glass door rotates into and out of the door frame;

wherein the glass door attaches to the door frame such that the electronic lock is placed in a position such that the electronic lock will lock the glass door into a secured position;

wherein the first lamp, the second lamp, and the third lamp are secured onto the interior surfaces of the inner housing such that the first lamp, the second lamp, and the third lamp will illuminate the plants contained within the inner housing;

wherein the heater is contained within the tank;

wherein the tank hood, the fill aperture, and the fill cap are all installed in the superior surface of the tank;

wherein the air temperature sensor, the humidity sensor, the carbon dioxide sensor, and the pressure sensor are mounted within the interior space of the inner structure;

wherein the air temperature sensor, the humidity sensor, the carbon dioxide sensor, and the pressure sensor are electrically connected to the logic module.

8. The security device for a plant according to claim 7 wherein the first lamp is formed from a plurality of LEDs that generate UVC radiation.

9. The security device for a plant according to claim 8 wherein the temperature module comprises a Peltier module;

wherein the logic module controls the operation of the Peltier module.

10. The security device for a plant according to claim 8 wherein the temperature module is a water sleeve;

wherein the water sleeve refers to a rectangular block structure formed from two independent rectangular blocks that are assembled in a coaxial manner;

wherein the water sleeve forms the physical structure of the inner structure;

wherein the water sleeve comprises a hot water valve, a cold water valve, and a water temperature sensor;

wherein the logic module further controls the operation of the hot water valve and the cold water valve;

wherein the logic module further monitors the water temperature sensor;

wherein the water sleeve forms a negative space through which water is pumped for the purpose of maintaining the temperature within the internal chamber of the inner housing;

wherein the hot water valve is a solenoid valve;

wherein the cold water valve is a solenoid valve;

wherein the water sleeve further comprises a water temperature sensor;

wherein the water temperature sensor is a sensor that measures the temperature of the water flowing through the negative space of the water sleeve.

11. The security device for a plant according to claim 7 wherein the security device for a plant further comprises an internal frame;

wherein the internal frame is a rectilinear structure that is mounted within the outer frame;

wherein the inner housing is mounted in the internal frame such that the exterior surfaces of the inner housing are isolated from the interior surfaces of the outer frame;

wherein the inner structure is further modified to comprise a first window aperture, a second window aperture, and a third window aperture;

wherein the first window aperture is an aperture that is formed within the inner structure and through which UVC radiation is projected;

wherein the second window aperture is an aperture that is formed within the inner structure and through which UVC radiation is projected;

wherein the third window aperture is an aperture that is formed within the inner structure and through which UVC radiation is projected;

wherein the internal frame comprises an internal structure;

wherein the internal structure is a rectilinear frame;

wherein the internal structure further comprises an exchange fan vent and a makeup fan vent;

wherein the internal structure comprises a fourth window aperture, a fifth window aperture, and a sixth window aperture;

wherein the internal structure comprises a third door aperture;

wherein the third door aperture is an opening formed within the internal structure that accommodates the installation of the glass door;

wherein the exchange fan vent is an aperture formed within the internal structure that accommodates the expulsion of exhaust air from the inner housing;

wherein the makeup fan vent is an aperture formed within the internal structure that accommodates the introduction of makeup air from the inner housing;

wherein the fourth window aperture is an aperture that is formed within the internal structure;

wherein the fifth window aperture is an aperture that is formed within the internal structure;

wherein the sixth window aperture is an aperture that is formed within the internal structure.

12. The security device for a plant according to claim 11 wherein the inner structure is installed within the internal structure such that the first window aperture is aligned with the fourth window aperture;

wherein the inner structure is installed within the internal structure such that the second window aperture is aligned with the fifth window aperture;

wherein the inner structure is installed within the internal structure such that the third window aperture is aligned with the sixth window aperture;

wherein the first lamp is installed between the first window aperture and the fourth window aperture such that the interior space of the inner structure is illuminated;

wherein the second lamp is installed between the second window aperture and the fifth window aperture such that the interior space of the inner structure is illuminated;

wherein the third lamp is installed between the third window aperture and the sixth window aperture such that the interior space of the inner structure is illuminated.

13. The security device for a plant according to claim 12 wherein the first lamp is formed from a plurality of LEDs that generate UVC radiation.

14. The security device for a plant according to claim 13 wherein the temperature module comprises a Peltier module;

wherein the logic module controls the operation of the Peltier module.

15. The security device for a plant according to claim 13 wherein the temperature module is a water sleeve;

wherein the water sleeve refers to a rectangular block structure formed from two independent rectangular blocks that are assembled in a coaxial manner;

wherein the water sleeve forms the physical structure of the inner structure;

wherein the water sleeve comprises a hot water valve, a cold water valve, and a water temperature sensor;
wherein the logic module further controls the operation of the hot water valve and the cold water valve;
wherein the logic module further monitors the water temperature sensor;
wherein the water sleeve forms a negative space through which water is pumped for the purpose of maintaining the temperature within the internal chamber of the inner housing;
wherein the hot water valve is a solenoid valve;
wherein the cold water valve is a solenoid valve;
wherein the water sleeve further comprises a water temperature sensor;
wherein the water temperature sensor is a sensor that measures the temperature of the water flowing through the negative space of the water sleeve.

* * * * *